(12) United States Patent
Kim

(10) Patent No.: US 6,754,040 B2
(45) Date of Patent: Jun. 22, 2004

(54) DISK SPACER IN A DISK DRIVE SYSTEM

(75) Inventor: Seong Hoon Kim, San Jose, CA (US)

(73) Assignee: Samsung Electronics Co., LTD, Suwon (KR)

( * ) Notice: Subject to any disclaimer, the term of this patent is extended or adjusted under 35 U.S.C. 154(b) by 145 days.

(21) Appl. No.: 10/081,557

(22) Filed: Feb. 20, 2002

(65) Prior Publication Data

US 2003/0156349 A1 Aug. 21, 2003

(51) Int. Cl.[7] ............................................. G11B 33/14
(52) U.S. Cl. .................................................. 360/97.02
(58) Field of Search ........................... 360/97.02, 97.03

(56) References Cited

U.S. PATENT DOCUMENTS

| | | | | |
|---|---|---|---|---|
| 4,922,354 A | * | 5/1990 | Edwards | 360/97.03 |
| 5,006,942 A | * | 4/1991 | Brooks et al. | 360/98.08 |
| 5,239,431 A | * | 8/1993 | Day et al. | 360/98.08 |
| 5,504,638 A | * | 4/1996 | Kinoshita et al. | 360/98.08 |
| 5,615,067 A | * | 3/1997 | Jabbari et al. | 360/98.08 |
| 6,201,661 B1 | * | 3/2001 | Korkowski | 360/98.08 |
| 6,285,525 B1 | * | 9/2001 | McCutcheon et al. | 360/98.08 |

* cited by examiner

*Primary Examiner*—David Davis
(74) *Attorney, Agent, or Firm*—Gregory Smith & Associates; Jeffrey P. Aiello; Earle Jennings

(57) ABSTRACT

The inventors have found that by changing the outer wall shape of at least disk spacer, the air flow of the relevant inner region is disrupted, causing particulate adhesion to be minimized. The air flow disruption acts to blow more air through the inner region, effectively moving particles away from the inner region rather than retaining these particles. The inventors call disk spacers with outer wall shapes disrupting inner region air flow, screw-type spacers.

17 Claims, 5 Drawing Sheets

DISK SPACER IN A DISK DRIVE SYSTEM

TECHNICAL FIELD

This invention relates to mechanical spacers between disks and disk clamps in disk drive systems.

BACKGROUND ART

Disk drives are an important data storage technology, which include several crucial components. Disk drive read-write heads directly communicate with a disk surface containing the data storage medium over a track on the disk surface. This invention involves improving the ability to position at least one read-write head over the track on the disk surface.

FIG. 1A illustrates a typical prior art high capacity disk drive 10 including actuator arm 30 with voice coil 32, actuator axis 40, suspension or head arms 50–58 with slider/head unit 60 placed among the disks 12.

FIG. 1B illustrates a typical prior art high capacity disk drive 10 with actuator 20 including actuator arm 30 with voice coil 32, actuator axis 40, head arms 50–56 and slider/head units 60–66 with all but one disk 12 removed as well as including spindle motor 80.

Since the 1980's, high capacity disk drives 10 have used voice coil actuators 20–66 to position their read-write heads over specific tracks. The heads are mounted on head sliders 60–66, which float a small distance off the disk drive surface when in operation. Often there is one head per head slider for a given disk drive surface. There are usually multiple heads in a single disk drive, but for economic reasons, usually only one voice coil actuator.

Voice coil actuators are further composed of a fixed magnet actuator 20 interacting with a time varying electromagnetic field induced by voice coil 32 to provide a lever action via actuator axis 40. The lever action acts to move head arms 50–56 positioning head slider units 60–66 over specific tracks with speed and accuracy. Actuator arms 30 are often considered to include voice coil 32, actuator axis 40, head arms 50–56 and head sliders 60–66. Note that actuator arms 30 may have as few as a single head arm 50. Note also that a single head arm 52 may connect with two head sliders 62 and 64.

FIG. 2 illustrates an exploded schematic view of a disk drive 10 including disk 12 separated by spacer 84 from disk 14 as found in the prior art.

Disk drive 10 also includes a printed circuit board assembly 120, a disk drive base 100, a spindle motor 80, a disk 12, a voice coil actuator 30, a disk clamp 82 and a disk drive cover 110.

FIG. 3A illustrates a disk spacer 84 as in FIG. 2 with an emphasis on its outer surface, which is essentially cylindrical, as found in the prior art.

A spacer 84 may include screw holes, which are not relevant to the invention and will not be illustrated nor discussed hereafter.

FIG. 3B illustrates a typical prior art situation regarding the flow of air between disks 12 and 14 separated by disk spacer 84 while spinning in a disk drive.

Spindle motor 80 powers the rotating disk assembly including disks 12 and 14, as well as disk spacer 84 and disk clamp 82. To insure mechanical stability, all members of the rotating disk assembly are required to be symmetric about the axis of rotation for the assembly. This has lead prior art disk spacers 84 to have smooth cylindrical walls facing the air gap between disks 12 and 14.

The outer wall of at least disk spacer 84 is cylindrical. In many prior art disk systems, the outer walls of spindle motor 80 and disk clamp 82 are also cylindrical.

It should be noted that while the prior art disk spacers 84 address the requirements known in the prior art, there are some problems with these devices.

FIG. 3C illustrates the effect of smooth outer walls for disk spacer 84, spindle motor 80 and disk clamp 82 upon the flow of air in the air cavity around disks 12 and 14, as found in the prior art.

In each of the inner regions 140 near disk spacer 84, as well as spindle motor 80 and disk clamp 82, the inventors have found that the air is nearly stationary, particularly in region 142. This region 142 is a zone dominated by the solid body motion of the cylindrical outer wall. This region of stationary air allows particles carried in the air to adhere to the surfaces of disks 12 and/or 14. These particles cause media failures for the disk surfaces of inner regions 140 to be much higher than outside these inner regions 140. What is needed is a way of reducing particle adherence to these inner regions 140 so as to reduce data failures in these regions.

SUMMARY OF THE INVENTION

The inventors have found that by changing the outer wall shape of at least the disk spacer, the air flow of the relevant inner region is disrupted, causing particulate adhesion to be minimized. The air flow disruption acts to blow more air through the inner region, effectively moving particles away from the inner region rather than retaining these particles. The inventors call disk spacers with outer wall shapes disrupting the flow of air in the inner region, screw-type spacers. Note that the invention also relates to the outer wall of disk clamps.

Mass distribution in a screw-type spacer is symmetrical about the axis of rotation of the rotating disk assembly to which the screw-type spacer belongs. This mass distribution helps minimize mechanical vibration when the rotating disk assembly is in operation within its disk drive.

The outer wall shapes will be called blades herein. The invention includes blades of many shapes, including, but not limited to, rectangular prisms oriented with respect to the radius from the axis of rotation, as well as non-rectangular shapes such as triangular prisms providing a symmetric mass distribution for the screw-type spacer about the axis of rotation.

The invention includes not only screw-type spacers, but also the method of making disk drives using screw-type spacers and those disk drives as a product of the manufacturing process. The invention includes the method of operating the screw-type spacer to blow away particles from the inner region about the screw-type spacer and neighboring disks.

Note that a disk drive may include more than one screw-type spacer, each blowing particles away from the inner region surrounding itself.

These and other advantages of the present invention will become apparent upon reading the following detailed descriptions and studying the various figures of the drawings.

DETAILED DESCRIPTION OF THE INVENTION

Figure 1A:
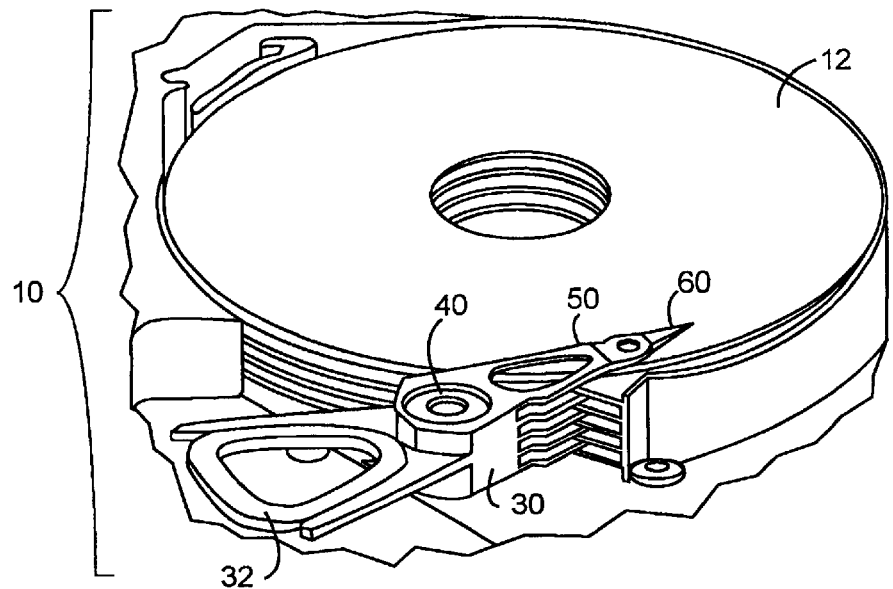
FIG. 1A illustrates a typical prior art high capacity disk drive 10 including actuator arm 30 with voice coil 32, actuator axis 40, suspension or head arms 50–58 with slider/head unit 60 placed among the disks 12.
Figure 1B:
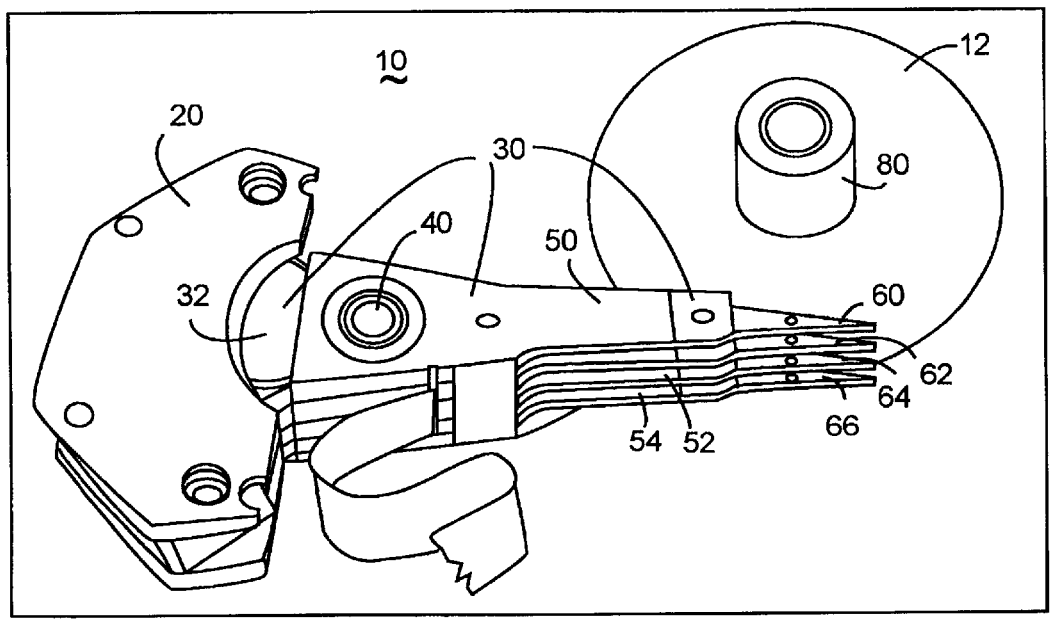
FIG. 1B illustrates a typical prior art high capacity disk drive 10 with actuator 20 including actuator arm 30 with voice coil 32, actuator axis 40, head arms 50–56 and slider/head units 60–66 with all but one disk 12 removed as well as including spindle motor 80.
Figure 2:
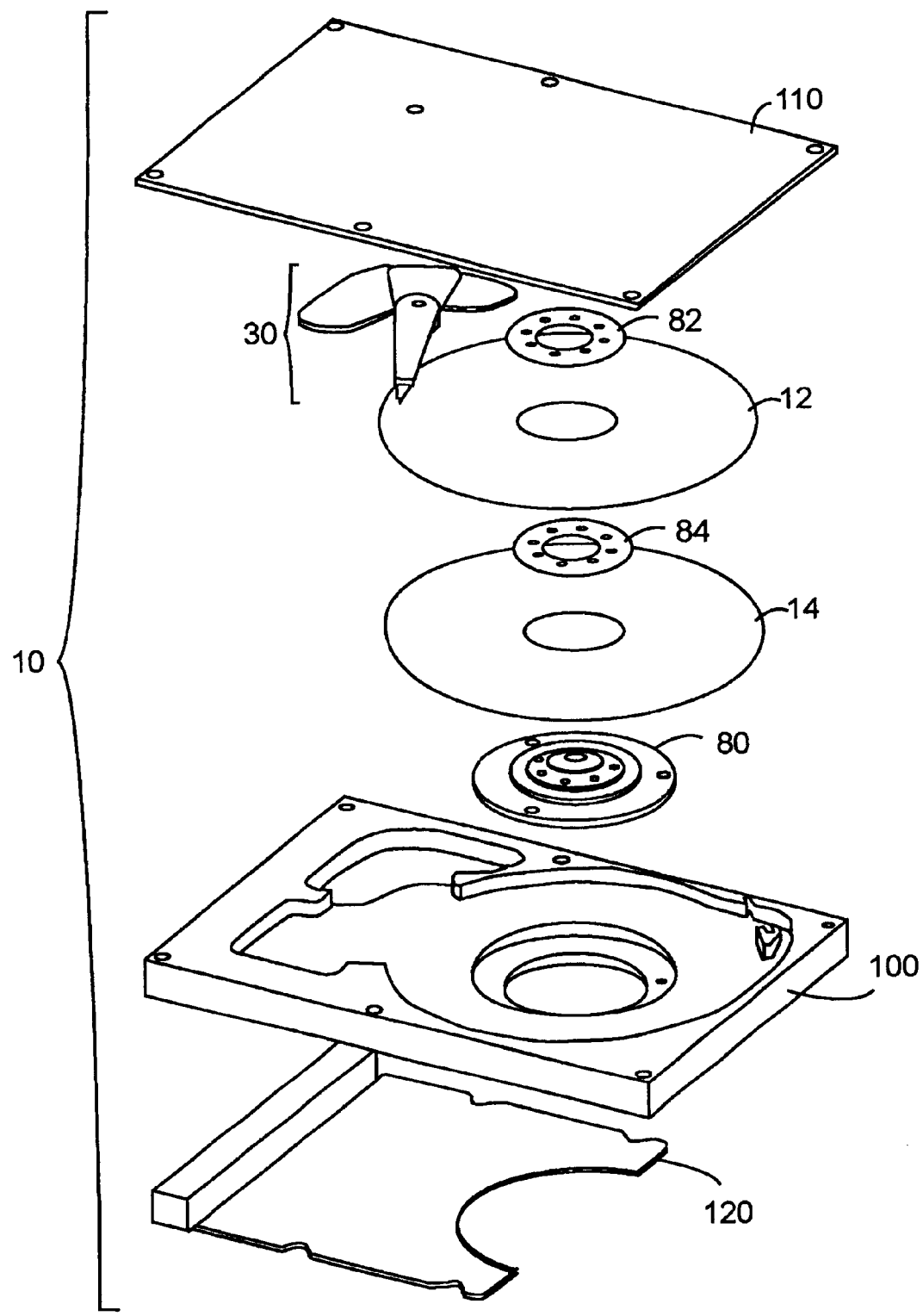
FIG. 2 illustrates an exploded schematic view of a disk drive 10 including disk 12 separated by spacer 84 from disk 14 as found in the prior art.

The inventors have found that the air is nearly stationary in each of the inner regions 140 near disk spacer 84, as well as spindle motor 80 and disk clamp 82. This allows particles carried in the air to adhere to the surfaces of disks 12 and/or 14. These particles cause data failures for the disk surfaces of inner regions 140 to be much higher than outside these inner regions 140.

The inventors have found that by changing the outer wall shape of at least disk spacer 84, the relevant inner region 140 air flow is disrupted, minimizing particulate adhesion, effectively moving particles away rather than retaining these particles. The same observation was noted regarding disk clamp 82.

Figure 4A:
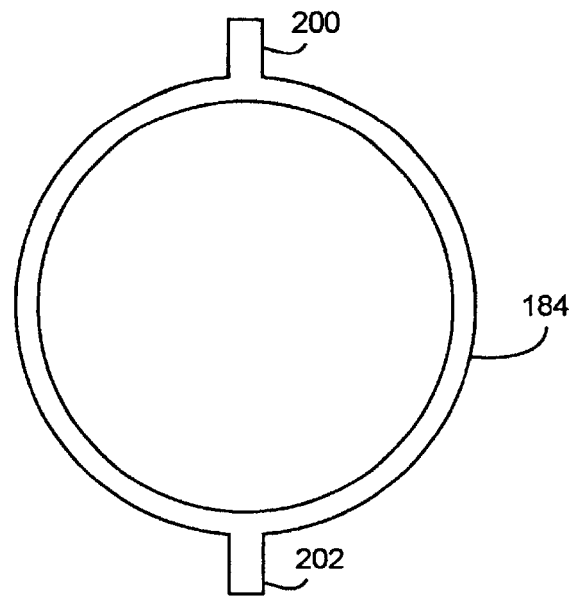
FIG. 4A illustrates screw-type spacer 184 with an outer wall shape including two blades 200 and 202, which act to disrupt inner region 140 air flow.

FIG. 4A illustrates screw-type spacer 184 with an outer wall shape including two blades 200 and 202, which act to disrupt inner region 140 air flow.

Figure 4B:
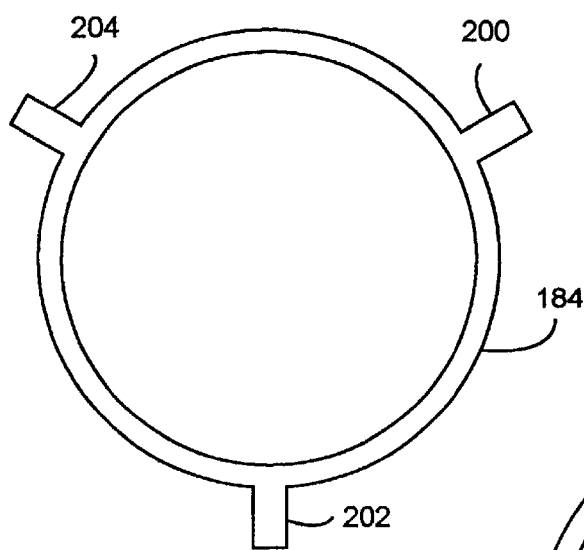
FIG. 4B illustrates screw-type spacer 184 with an outer wall shape including three blades 200, 202, and 204, which act to disrupt inner region 140 air flow.

FIG. 4B illustrates screw-type spacer 184 with an outer wall shape including three blades 200, 202, and 204, which act to disrupt inner region 140 air flow.

Figure 4C:
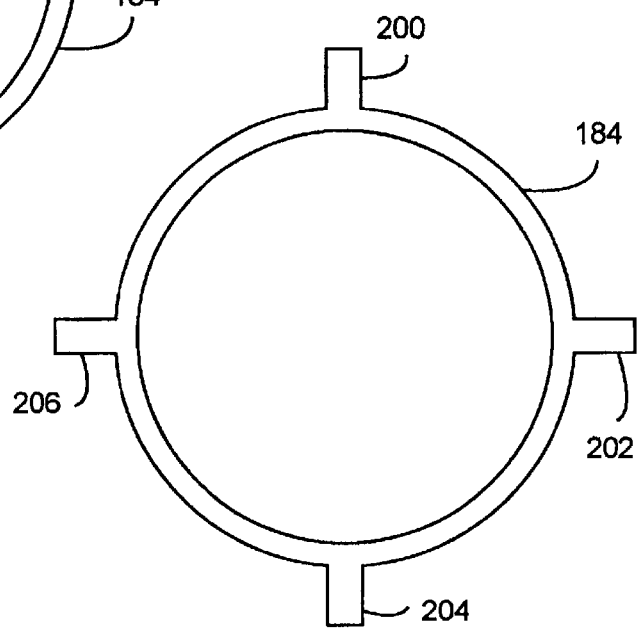
FIG. 4C illustrates screw-type spacer 184 with an outer wall shape including four blades 200, 202, 204, and 206, which act to disrupt inner region 140 air flow.

FIG. 4C illustrates screw-type spacer 184 with an outer wall shape including four blades 200, 202, 204, and 206, which act to disrupt inner region 140 air flow.

Figure 5A:
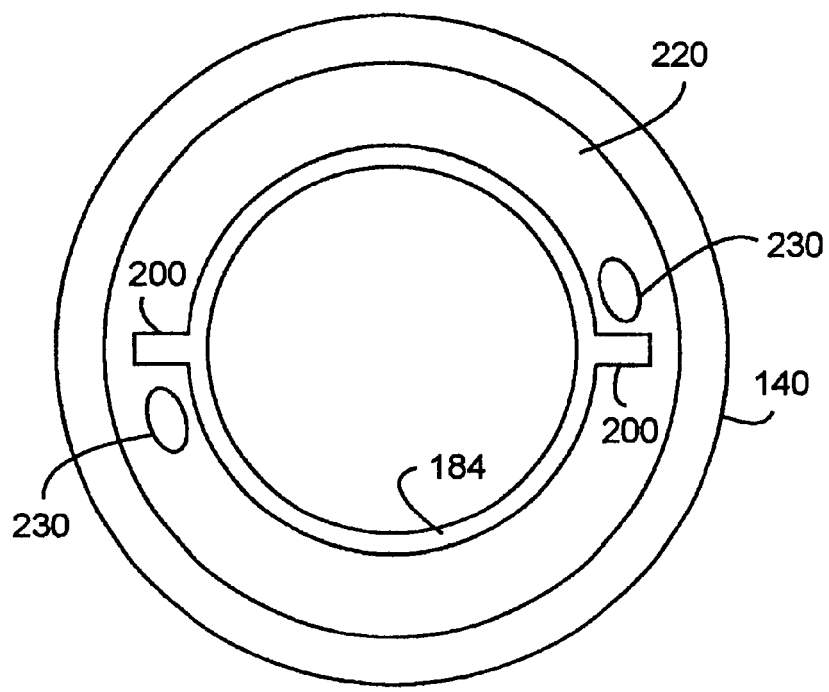
FIG. 5A illustrates inner region 140 resulting from the flow of air about screw-type spacer 184 in place of spacer 84 with inner region 140 including a mixing layer zone 220 which further includes blowing effect regions 230 behind each of the blades 200 and 202.

FIG. 5A illustrates inner region 140 resulting from the flow of air about screw-type spacer 184 in place of spacer 84 with inner region 140 including a mixing layer zone 220 which further includes blowing effect regions 230 behind each of the blades 200 and 202.

It should be noted that while blades 200, 202, 204, and 206 have been shown as essentially rectangle appendages to a cylindrical shape to form screw-type spacer 184, this has been done to simplify the presentation and air flow simulations. One of skill in the art will recognize that other blade shapes are also capable of providing the blowing effect 230, causing the mixing layer 220 to form, and effectively blowing particles away from the inner region 140.

Figure 5B:
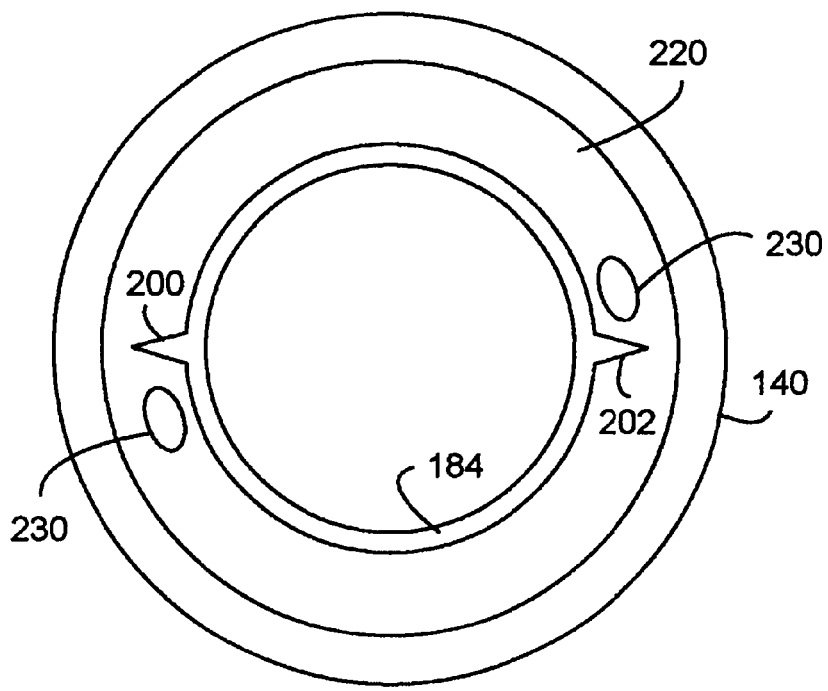
FIG. 5B illustrates inner region 140 resulting from the flow of air about screw-type spacer 184 in place of spacer 84 with inner region 140 including a mixing layer zone 220 which further includes blowing effect regions 230 behind each of the triangular blades 200 and 202.

FIG. 5B illustrates inner region 140 resulting from the flow of air about screw-type spacer 184 in place of spacer 84 with inner region 140 including a mixing layer zone 220 which further includes blowing effect regions 230 behind each of the triangular blades 200 and 202.

Figure 3A:
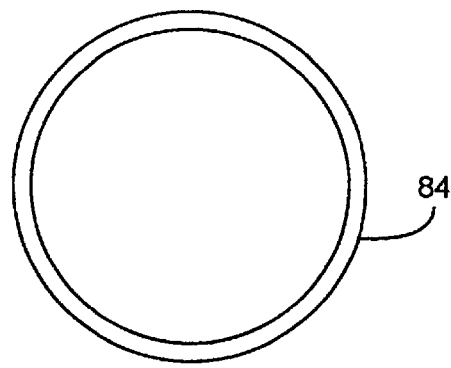
FIG. 3A illustrates a disk spacer 84 as in FIG. 2 with an emphasis on its outer surface, which is essentially cylindrical, as found in the prior art.
Figure 3C:
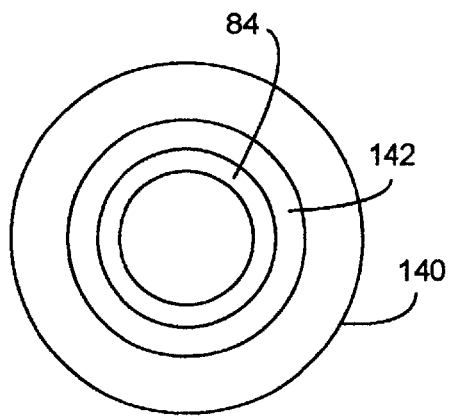
FIG. 3C illustrates the effect of smooth outer walls for disk spacer 84, spindle motor 80 and disk clamp 82 upon the flow of air in the air cavity around disks 12 and 14, as found in the prior art.
Figure 3B:
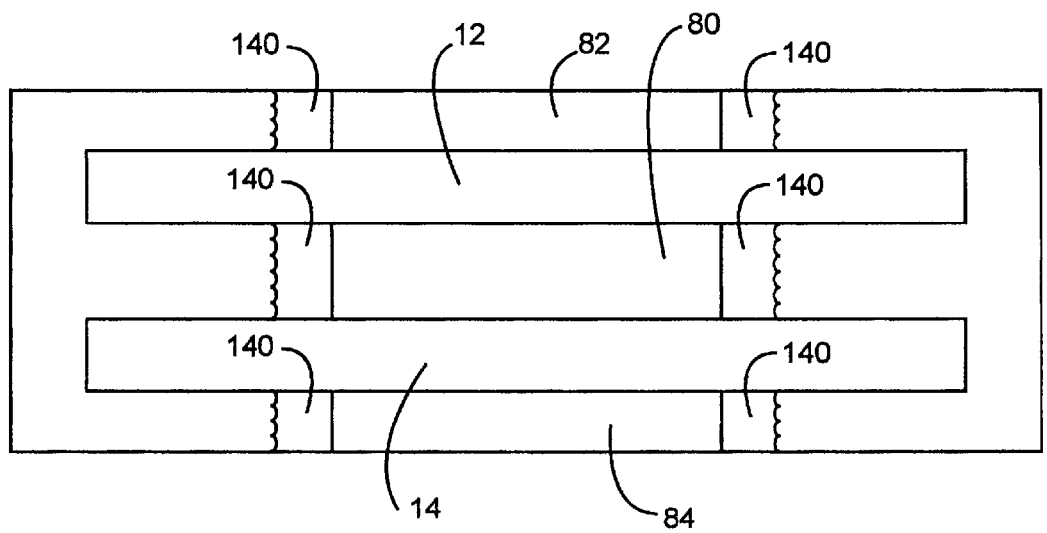
FIG. 3B illustrates a typical prior art situation regarding the flow of air between disks 12 and 14 separated by disk spacer 84 while spinning in a disk drive.

Note that a screw-type spacer 184 is used in a disk assembly, which is rotated when in operation. The screw-type spacer 184 abuts two disks, 12 and 14 as illustrated in FIG. 3B, with an effect on the inner region 140 as illustrated in FIGS. 5A and 5B.

Each blade 200 and 202 disrupts air flow in inner region 140 by at least the following process. The blade collection member acts upon the air to form a blowing effect region 230 within inner region 140. The blowing effect region imparts to a particle, within the inner region 140, a tendency to move away from inner region 140. This imparted motion is dominant in the mixing layer zone 220 within inner region 140. Note that the mixing layer zone 220 will tend to include blowing effect region 230.

In both FIGS. 5A and 5B, each blade acts to disrupt air flow in the inner region when the disk assembly is rotated to blow particles in the inner region away from the inner region.

The preceding embodiments have been provided by way of example and are not meant to constrain the scope of the following claims.

What is claimed is:

1. A disk drive, comprising:
   a disk assembly rotating about an axis of rotation, including:
   a screw-type spacer separating a first disk and a second disk creating an inner region between said first disk and said second disk surrounding said outer wall and surrounding all members of a blade collection;
   wherein said screw-type spacer, includes:
   a first blade extending out from an outer wall; and
   a second blade extending out from said outer wall;
   wherein said blade coil action is comprised of said first blade and said second blade;
   wherein all of said blade collection members collectively provide said screw-type spacer with a symmetric mass distribution about said axis of rotation; and
   wherein said blade collection member acts to disrupt air flow in said inner region when said disk assembly is rotated to blow particles in said inner region away from said inner region, for each of said blade collection members.

2. The apparatus of claim 1, further comprising:
   a third blade extending out from said outer wall; and
   wherein said blade collection further comprises said third blade.

3. The apparatus of claim 2, further comprising:

a fourth blade extending out from said outer wall; and wherein said blade collection further comprises said fourth blade.

4. The apparatus of claim 1, wherein at least one member of said blade collection forms a rectangular appendage extending from said outer wall.

5. The apparatus of claim 1, wherein at least one member of said blade collection forms a triangular blade extending from said outer wall.

6. A screw-type spacer for a disk drive rotating assembly comprising:

a first blade extending out from an outer wall; and a second blade extending out from said outer wall;

wherein all members of a blade collection collectively provide said screw-type spacer with a radially symmetric mass distribution about a center of mass of said screw-type spacer;

wherein said blade collection is comprised of said first blade and said second blade;

wherein an inner region is created between a first disk and a second disk surrounding said outer wall and surrounding said blade collection members; and wherein each of said blade collection members act to disrupt air flow in said inner region to blow particles in said inner region away from said inner region.

7. The apparatus of claim 6, further comprising:

a third blade extending out from said outer wall; and wherein said blade collection further comprises said third blade.

8. The apparatus of claim 7, further comprising:

a fourth blade extending out from said outer wall; and wherein said blade collection further comprises said fourth blade.

9. The apparatus of claim 6, wherein at least one member of said blade collection forms a rectangular appendage extending from said outer wall.

10. The apparatus of claim 6, wherein at least one member of said blade collection forms a triangular blade extending from said outer wall.

11. A rotating disk assembly, comprising:

a screw-type spacer of claim 6 separating a first disk and a second disk creating an inner region between said first disk and said second disk surrounding said outer wall and surrounding said blade collection members;

wherein said blade collection member acts to disrupt air flow in said inner region when said rotating disk assembly is rotationally operated to blow particles in said inner region away from said inner region, for each of said blade collection members.

12. A disk drive, comprising said rotating disk assembly of claim 11.

13. A method of making said disk drive of claim 6 comprising the steps of:

placing said screw-type spacer between said first disk and said second disk to create said disk drive.

14. Said disk drive as a product of the process of claim 13.

15. A method of a disk drive rotating a disk assembly including an outer wall with at least two members of a blade collection extending outward from said outer wall, comprising the steps of:

said blade collection member disrupting air flow in an inner region formed between two disks abutting said outer wall, for each of said blade collection members;

wherein the step of said blade collection member disrupting air flow in said inner region, for each of at least two of said blade collection members, is further comprised of the steps of:

said blade collection member acting upon said air to form a blowing effect region within said inner region; and said blowing effect region imparting to a particle within said inner region a tendency to move away from said inner region;

wherein said rotating disk assembly has an axis of rotation; and wherein said rotating disk assembly mass is symmetrically distributed about said axis of rotation.

16. The method of claim 15, wherein said blade collection has exactly two members.

17. There method of claim 15, wherein said outer wall and said blade collection members are contained in a screw-type spacer included in said rotating disk assembly.

* * * * *